(12) United States Patent
Chen (10) Patent No.: US 12,456,902 B1
(45) Date of Patent: Oct. 28, 2025

(54) FLYWHEEL DEVICE OF ENERGY CONVERTING EQUIPMENT

(71) Applicant: Feng-Tien Chen, Taichung (TW)

(72) Inventor: Feng-Tien Chen, Taichung (TW)

( * ) Notice: Subject to any disclaimer, the term of this patent is extended or adjusted under 35 U.S.C. 154(b) by 11 days.

(21) Appl. No.: 18/640,192

(22) Filed: Apr. 19, 2024

(51) Int. Cl.
*H02K 7/02* (2006.01)
*F03G 3/08* (2006.01)
*F16F 15/31* (2006.01)

(52) U.S. Cl.
CPC ............... *H02K 7/02* (2013.01); *F03G 3/08* (2013.01); *F16F 15/31* (2013.01)

(58) Field of Classification Search
CPC ......... F16F 15/31; F16F 15/315; F15F 15/261
See application file for complete search history.

(56) References Cited

U.S. PATENT DOCUMENTS

| | | | | |
|---|---|---|---|---|
| 3,248,967 | A | * | 5/1966 | Lewis ............ F16F 15/31 74/573.12 |
| 4,612,494 | A | | 9/1986 | Kawamura |
| 7,044,022 | B2 | | 5/2006 | Kim |
| 10,122,240 | B2 | | 11/2018 | Tsai |

FOREIGN PATENT DOCUMENTS

| | | | | | |
|---|---|---|---|---|---|
| CN | 1066106 | A | * | 11/1992 | ............ F03D 9/12 |
| CN | 107741301 | A | * | 2/2018 | ......... F16F 15/3153 |
| CN | 106768643 | B | * | 6/2019 | ............ G01M 1/36 |
| CN | 110718986 | A | | 1/2020 | |
| CN | 216279196 | U | * | 4/2022 | |
| CN | 115833462 | A | | 3/2023 | |
| CN | 116677748 | A | * | 9/2023 | ............ F16F 15/31 |
| EP | 508790 | A1 | * | 10/1992 | |
| JP | S61286636 | A | * | 12/1986 | |
| TW | 175512 | B | | 12/1991 | |

* cited by examiner

*Primary Examiner* — Daniel D Yabut
(74) *Attorney, Agent, or Firm* — Birch, Stewart, Kolasch & Birch, LLP (57) ABSTRACT

The flywheel device comprises a disc-shaped body, a pair of ball screw members, and a pair of masses. The ball screw member includes a screw shaft and a pair of ball nuts. The screw shaft is received in the disc-shaped body and has a middle section, a left section with forward threads, and a right section with reverse threads. One of the ball nuts is screwed to the left section of the screw shaft, and the other ball nut is screwed to the right section of the screw shaft. One of the masses is coupled to the ball nuts screwed to the left sections of the screw shafts, and the other mass is coupled to the ball nuts screwed to the right sections of the screw shafts.

9 Claims, 10 Drawing Sheets

FLYWHEEL DEVICE OF ENERGY CONVERTING EQUIPMENT

FIELD

The invention relates to the technical field of flywheels, and in particular to a flywheel device for an energy converting equipment.

BACKGROUND

Flywheel energy conversion technology has played an increasingly important role in recent years due to its advantages, such as fast start-up capacity, low maintenance costs, long lifespan, environmental friendliness, high energy storage, quick charging, and unlimited charge/discharge cycles. The flywheels currently used in energy conversion equipment typically have a fixed moment of inertia, as disclosed in U.S. Pat. Nos. 4,612,494 and 10,122,240. Unfortunately, these flywheels not only consume a significant amount of energy during start-up but also fail to provide an adequate solution to the problem of slowing rotation speed when converting kinetic energy into electrical energy. While US U.S. Pat. No. 7,044,022 introduced an improved flywheel with variable moment of inertia, it does not effectively address these issues. Furthermore, changing the moment of inertia can make it challenging for the flywheel to maintain balanced rotation.

SUMMARY

The inventor has recognized that by ensuring the moment of inertia of a flywheel can vary stably with its rotation speed, the aforementioned drawbacks of the prior art flywheel can be effectively addressed According to the invention, a flywheel device is disclosed in which the moment of inertia can vary stably with its rotation speed. The flywheel comprises a disc-shaped body coupled to the shaft of the rotating device, a pair of ball screw members, and a pair of masses. Each of the ball screw members includes a screw shaft and a pair of ball nuts. The screw shaft is radially pivoted within the disc-shaped body and has a middle section, a left section with forward threads, and a right section with reverse threads. One of the two ball nuts is screwed onto the left section of its respective screw shaft, and the other ball nut is screwed onto the right section, allowing each ball nut to move back and forth between a starting position and an ending position. One of the masses is coupled to the ball nuts screwed onto the left sections of the screw shafts, and the other mass is coupled to the ball nuts screwed onto the right sections. This allows the masses to approach or move away from the middle section synchronously, altering the moment of inertia of the flywheel. Consequently, the rotating speed of the flywheel can be detected by observing the change in moment of inertia, which helps determine the mode in which the rotating electrical machine should operate.

In some embodiments of the invention, the flywheel further comprises a spring member. The spring member is arranged between the masses so that it stretches when the masses move apart and retracts when they come closer together. This helps to stabilize the movement of the masses.

BRIEF DESCRIPTION OF THE DRAWINGS

Other features and advantages of the invention will become apparent to those skilled in the art from the following detailed description of the embodiments for use with a rotating electrical machine in the light of the accompanying drawings, in which.

DETAILED DESCRIPTION

Figure 1:
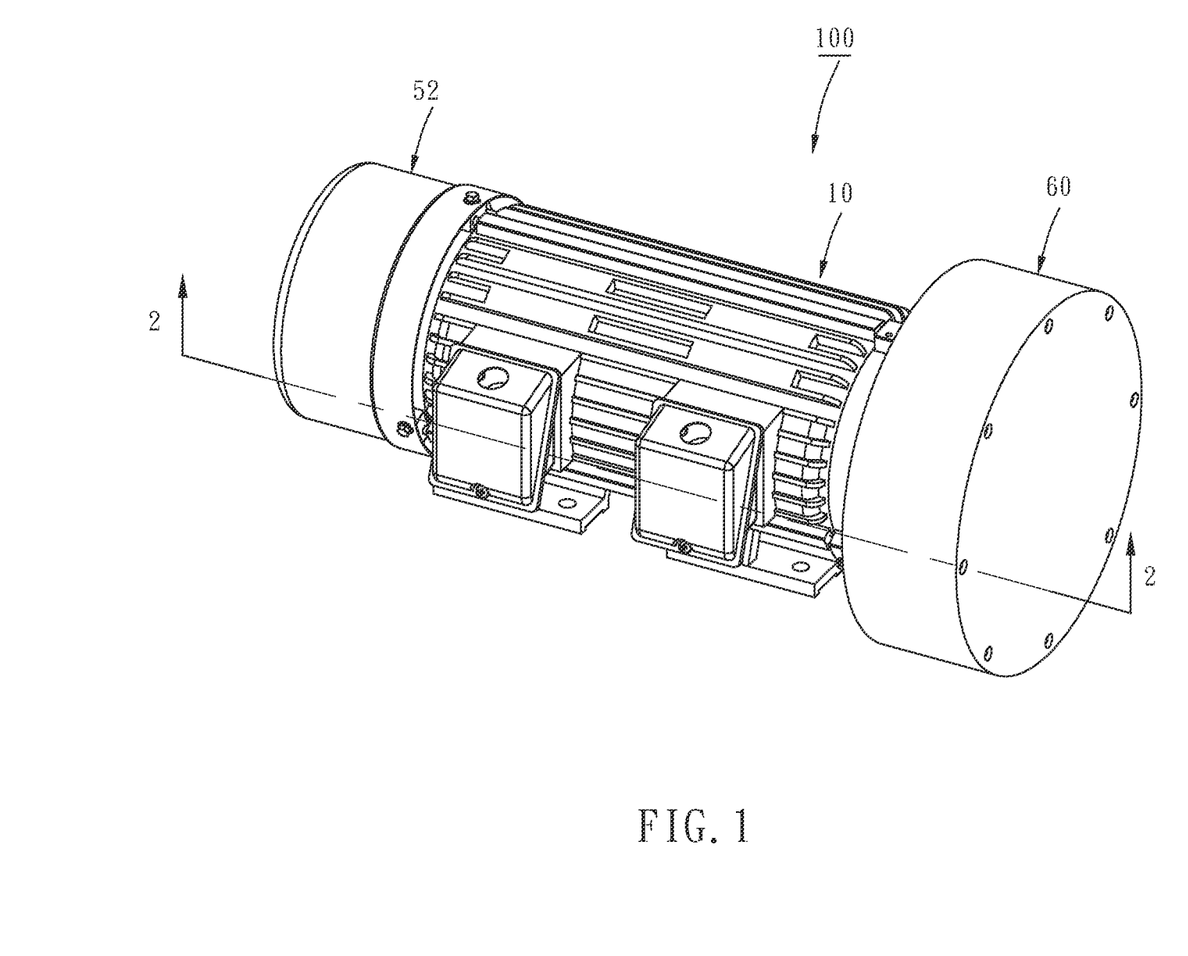
FIG. 1 is a perspective view of a first embodiment of the invention used with a rotating electrical machine.
Figure 2:
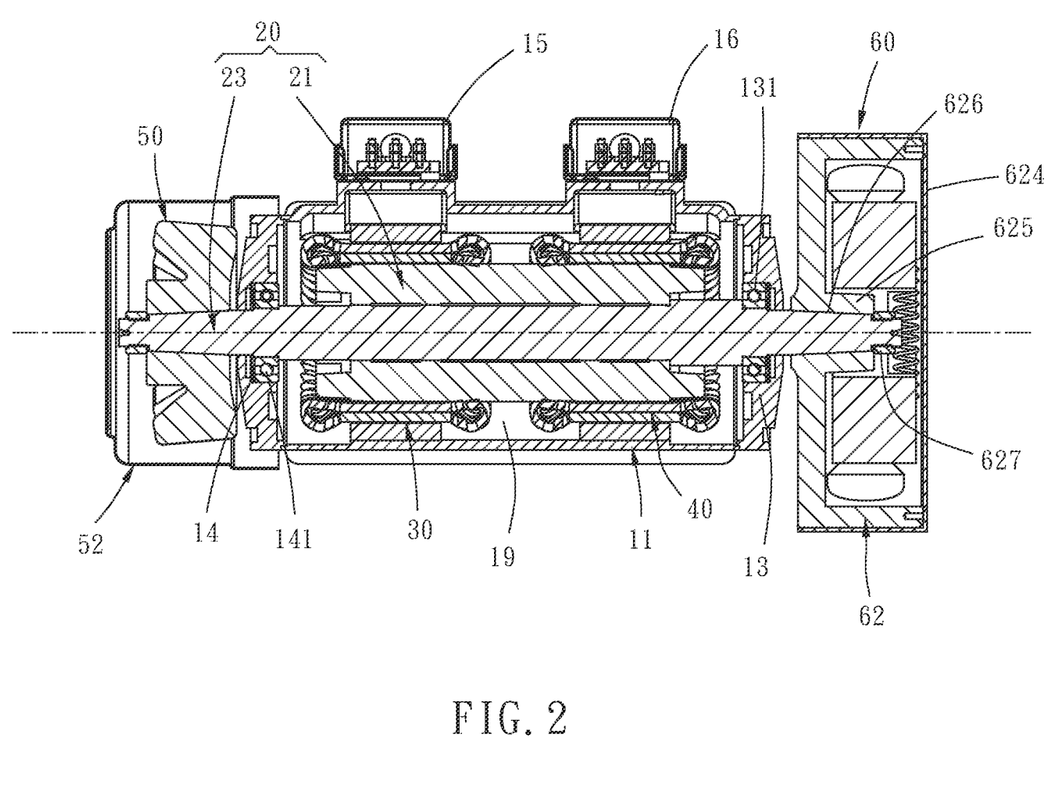
FIG. 2 is a cross-sectional view taken along the direction 2-2 of FIG. 1.
Figure 3:
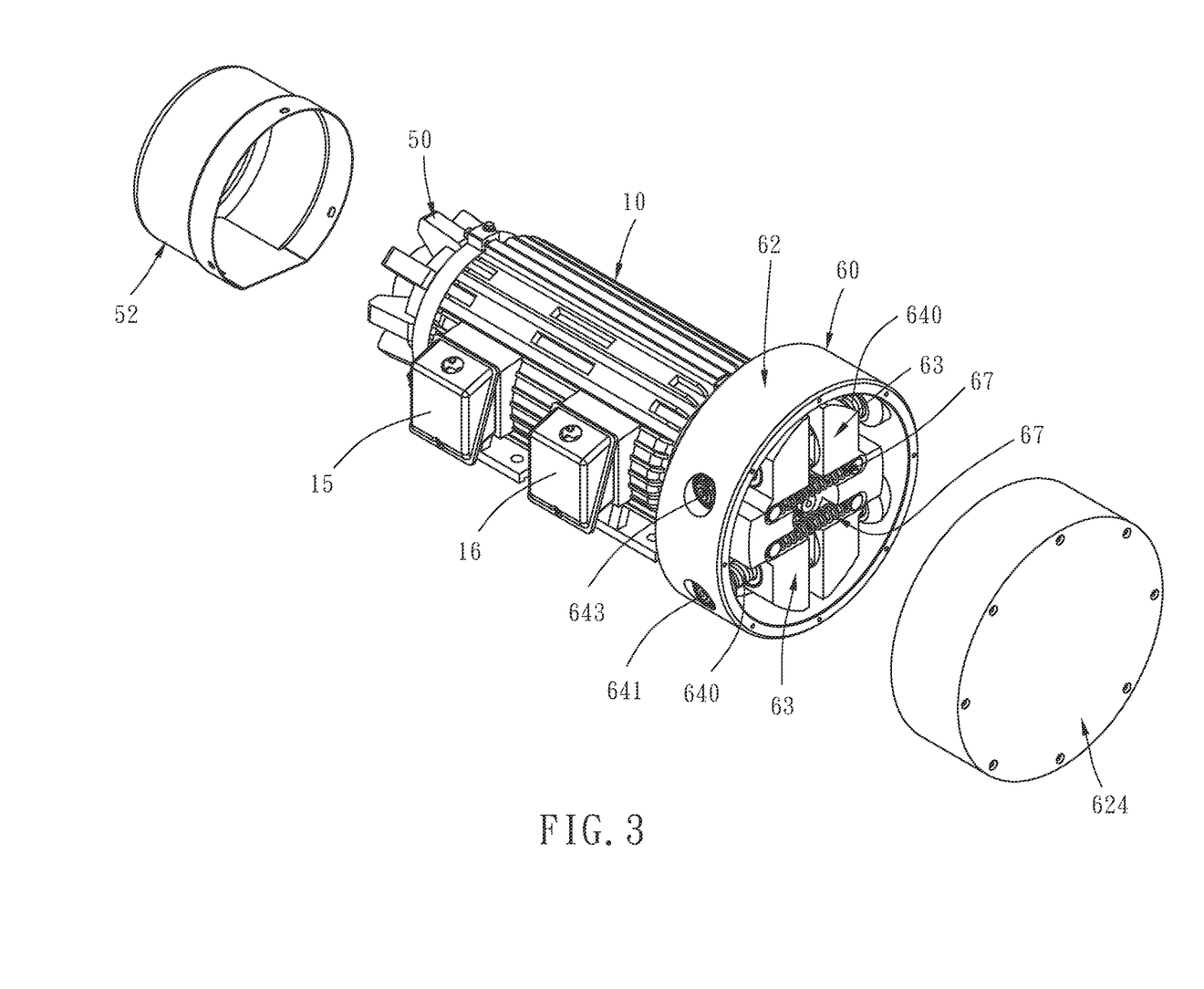
FIG. 3 is partially exploded view of the first embodiment of the invention shown in FIG. 1.

Referring firstly to FIG. 1 to FIG. 3, a rotating electrical machine is shown at 100. The rotating electrical machine 100 comprises a frame 10, a rotating device 20, a first stator 30, a second stator 40, a cooling fan 50 and a flywheel 60 embodied according to a first embodiment of the invention.

The frame 10 includes a casing 11, a first bearing seat 13, a second bearing seat 14, a first connection box 15 and a second connection box 16. The first bearing seat 13 with a first bearing 131 and the second bearing seat 14 with a second bearing 141 are respectively mounted on both ends of the casing 11 to define a receiving space 19. The first connection box 15 and the second connection box 16 are respectively fixed on a surface of the casing 11.

The rotating device 20, in this embodiment, includes a rotor 21 and a shaft 23. The rotor 21 includes a core portion stacked by a plurality of silicon-steel sheets to serve as a magnetic flux path and is disposed in the receiving space 19. The shaft 23 is fixed to the center of the rotor 21 in a way that a first end of the shaft 23 is pivotally connected to the first bearing 131 and extends to the outside of the casing 11 and a second end of the shaft 23 is pivotally connected to the second bearing 141 and also extends to the outside of the casing 11.

The first and second stator 30, 40 include respectively a first and second stator bodies 302,402 configured by a plurality of annular silicon-steel sheets, and a first and second stator winding units 304, 404 installed in the first and second stator bodies 302,402. In this embodiment, the first and second stator 30, 40 are respectively fixed in the casing 11 and received in the receiving space 1 in a manner that they are spaced apart from each other by a predetermined distance and form an air gap with the rotor 21.

The cooling fan 50 is coupled to the first end of the shaft 23 and driven thereby. In another embodiment, the cooling fan 50 may also be another flywheel with the same structure as the flywheel 60. In this embodiment, the frame 10 has an end cover 52 to cover the cooling fan 50 therein.

Next, referring to FIG. 4 to FIG. 7, the flywheel 60 comprises a disc-shaped body 62, a pair of masses 63, and a pair of ball screw members 64.

The body 62 includes a base plate 620, an annular wall 622 extending upward from the periphery of the base plate 620, a receiving space 623 defined by the base plate 620 and the annular wall 622, and an outer cover 624 fixed to the upper end of the annular wall 622. The base plate 620 has a convex ring 625 extending inward along its axis and an axis hole 626. When assembled, the first end of the shaft 23 penetrates the convex ring 625 through the axis hole 626 and is then secured with a nut 627.

Figure 4:
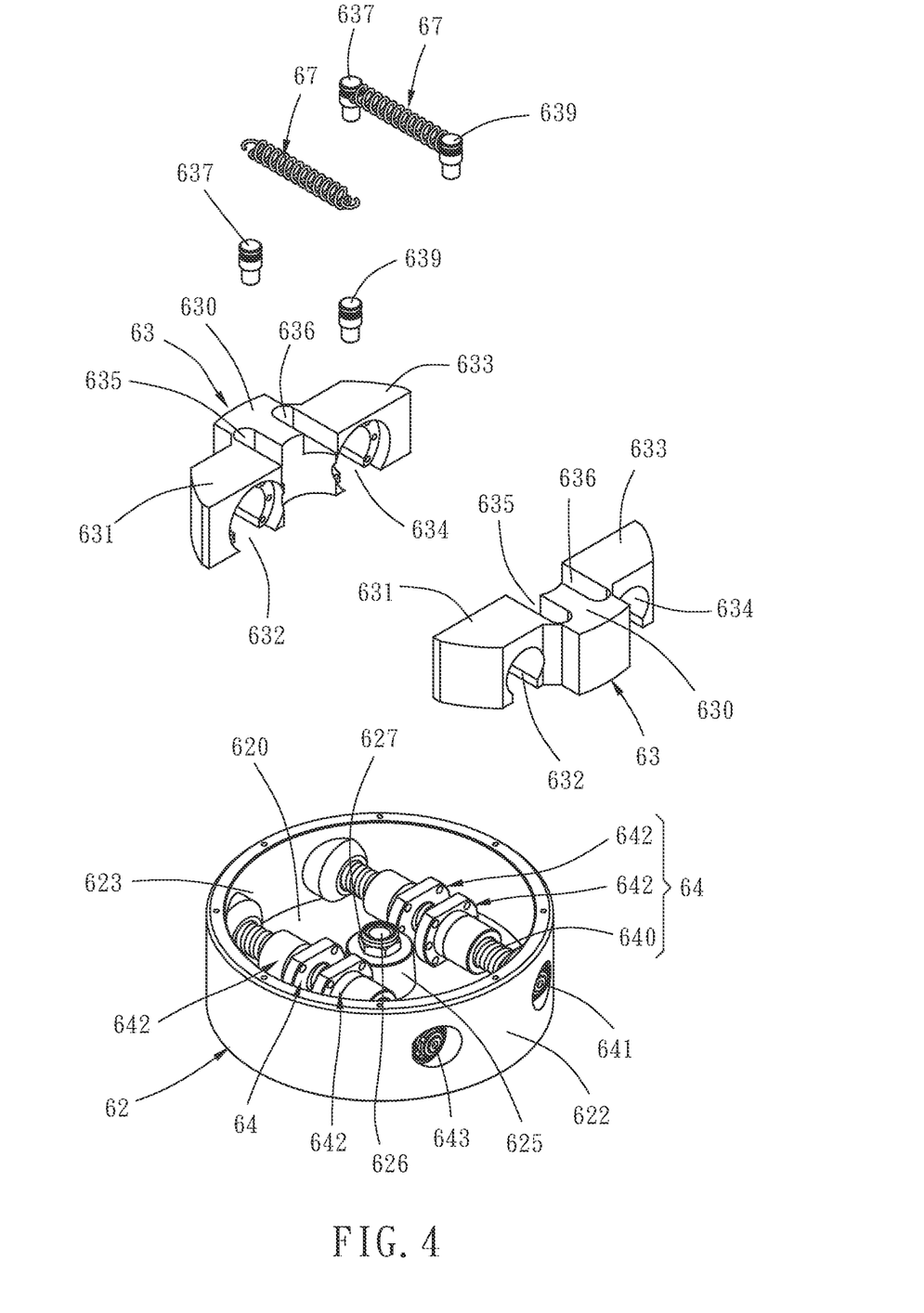
FIG. 4 is a partially exploded perspective view of the first embodiment of the invention shown in FIG. 1.
Figure 5:
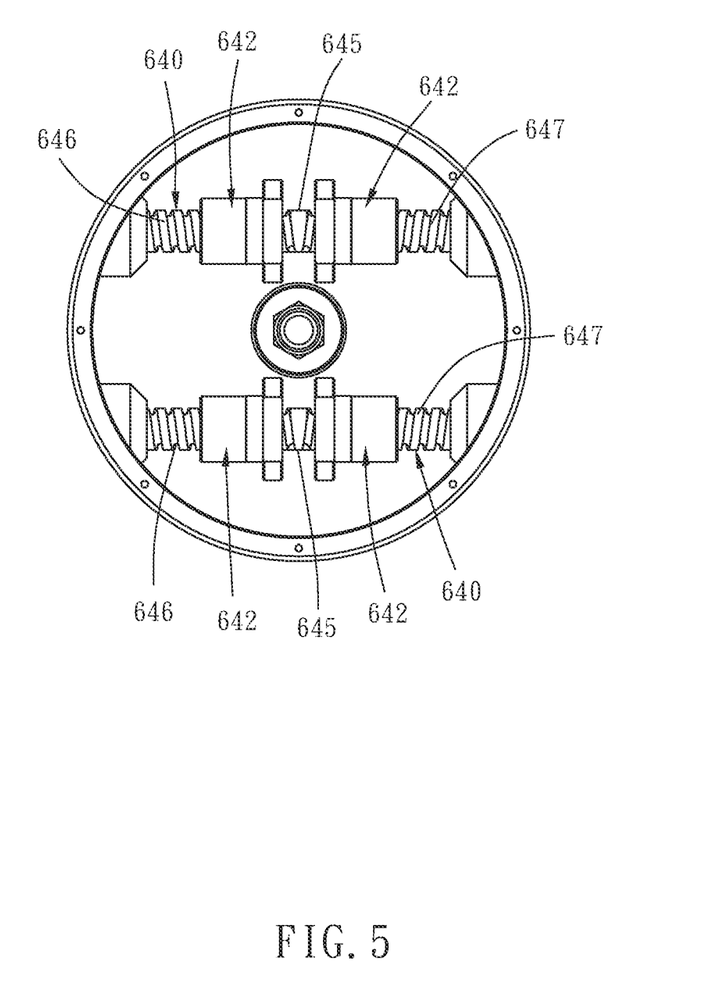
FIG. 5 is a top view of some parts assembled of the first embodiment of the invention shown in FIG. 1.
Figure 6:
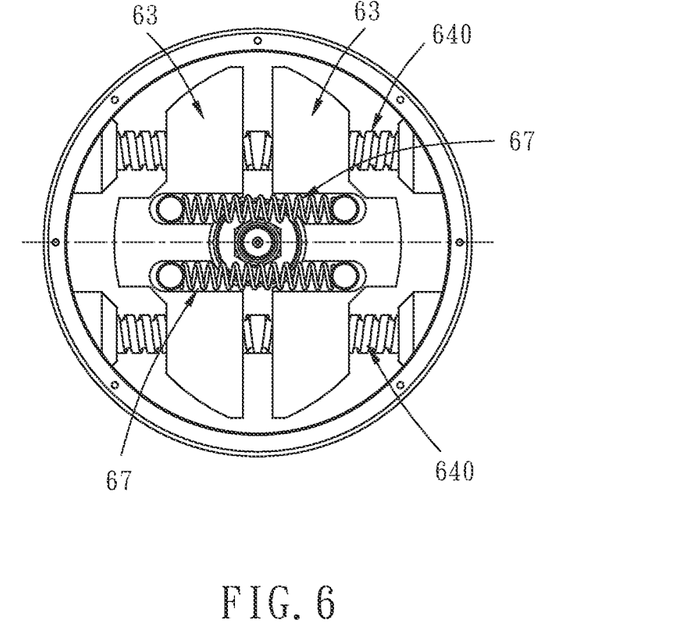
FIG. 6 is a top view of some parts assembled of the first embodiment of the invention shown in FIG. 1, with the two masses approaching to each other.

Each of the ball screw members 64 has a screw shaft 640 and a pair of ball nuts 642. The screw shafts 640 are received in the receiving space 623 at intervals and radially fixed on the annular wall 622 by first bearings 641 and second bearings 643. Each of the screw shafts 640, as shown in FIG. 6, has a middle section 645, a left section 646 having forward threads, and a right section 647 having reverse threads. The right section 647 is the same length as the left section 646. One of the two nuts 642 is attached to the left section 646, and the other ball nut 642 is attached to the right section 647, allowing each ball nut 642 to move back and forth between a starting and ending position.

Each of the masses 63 has a central portion 630, a left wing portion 631 with a left recess 632, and a right wing portion 633 with a right recess 634. When assembled, the ball nuts 642 screwed to the left sections 646 of the screw shafts 640 are received in the left recess 632 and the right recess 634 of one of the masses 63, while the ball nuts 642 screwed to the right sections 647 of the screw shafts 640 are received in the left recess 632 and the right recess 634 of the other mass 63. This arrangement allows the masses 63 to move synchronously with the ball nuts 642

In this embodiment, the flywheel 60 further comprises a pair of springs 67. The central portion 630 of each mass 63 is provided with a left groove 635 and a right groove 636. One end of each spring 67 is fixed in the left groove 635 of one mass 63 by a first pin 637, while the other end is fixed in the left groove 636 of the other mass 63 by a second pin 639. Thereby, the springs 67 assist in the back-and-forth displacement speed of the masses.

The following is a detailed description of the operation of the rotating electrical machine 100.

Figure 8:
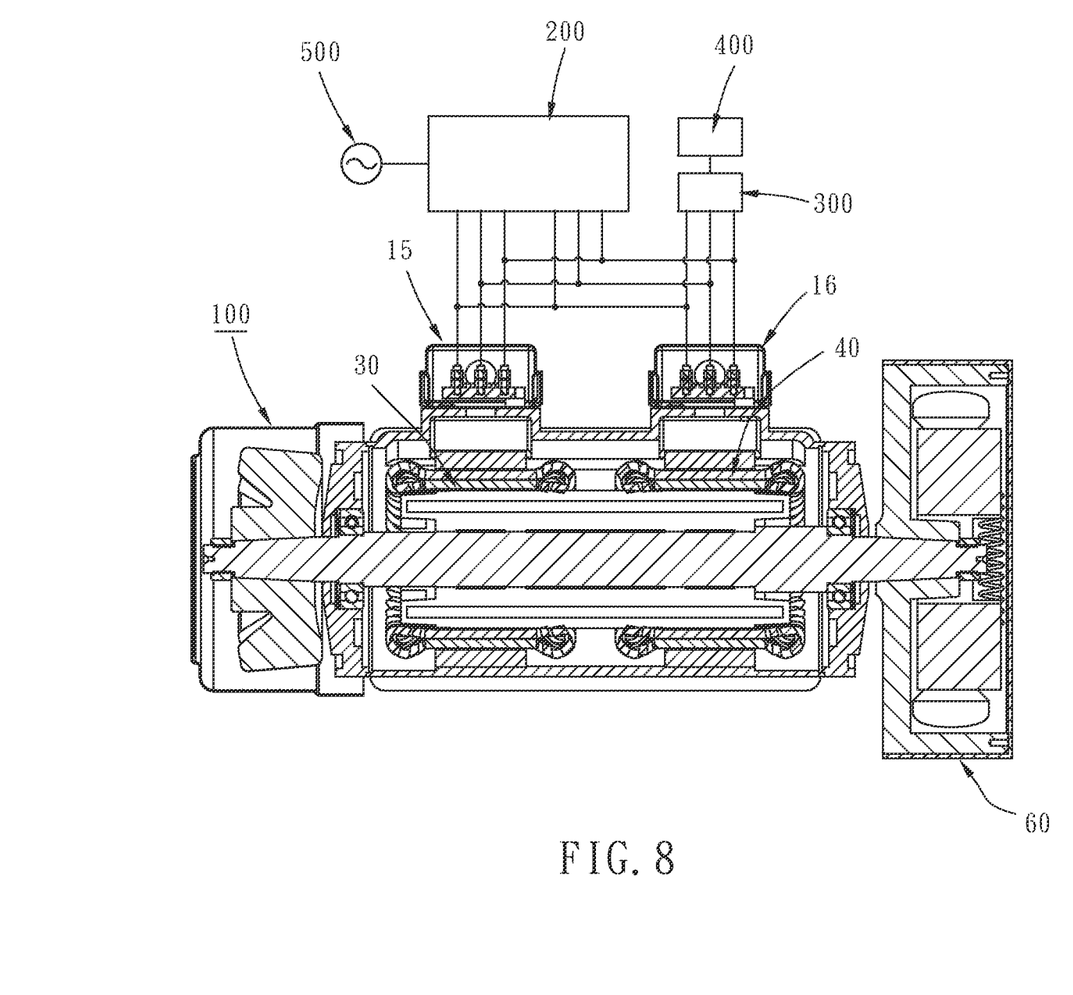
FIG. 8 shows a schematic diagram of the electrical connection between the rotating electrical machine used in the first embodiment of the invention of FIG. 1 and an external power supply during operation.

Please referring to FIG. 8, the rotating electrical machine 100 can be operated with a control device 200, a voltage stabilizer 300 and an external load 400.

The first input end of the first stator 30 is located in the first connection box 15. The second input end and the output end of the second stator 40 are located in the second connection box 16. The control device 200 includes an input end connected to an external power supply 500 and an output end connected respectively to the input end of the first stator 30 and the input end of the second stator 40. The voltage stabilizer 300 has an input end connected to the output end of the second stator 40 and an output end connected to the input end of the external load 400. When the external power supply 500 is turned on, the rotating electrical machine 100 operates in a motor mode, i.e., an energy storage mode, to drive the flywheel 60. Once the flywheel 60 reaches a certain speed, the second stator 40 is disconnected from the external power supply, switching the rotating electrical machine 100 to an energy release mode, i.e., the second stator 40 cooperates with the rotor 21 to operate in a generator mode.

Figure 7:
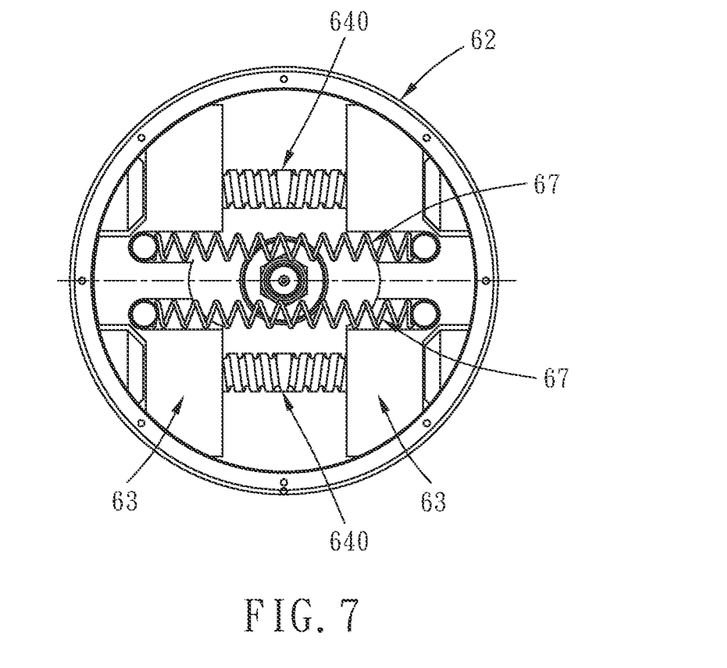
FIG. 7 is a top view of some parts assembled of the first embodiment of the invention shown in FIG. 1, with the two masses moving away from each other.

In more detail, before the flywheel 60 is driven, the masses 63 are positioned on the middle sections 645 of the screw shafts 640, which is the starting point, as shown in FIG. 7. As the rotation speed of the flywheel 60 gradually increases, the masses 63 are affected by centrifugal force and move synchronously from the starting point to the end point along the screw shafts 640. When the flywheel 60 reaches a certain speed, the masses 63 are located at the end point, as shown in FIG. 8. In this state, since the second stator 40 is disconnected from the external power supply, it will cooperate with the rotor 21 to operate in a generator mode, i.e., an energy release mode. The electric energy generated by the rotating electrical machine 100 is input to the external load 400, such as batteries or capacitors, through the voltage stabilizer 300.

It must be mentioned here that since the moment of inertia of the flywheel 60 is variable, when the moment of inertia reduces to a predetermined value during the energy release process, the control device 200 will detect this value and reconnect the second stator 40 to the external power supply 500. This allows the rotating electrical machine 100 to operate in energy storage mode, thereby maintaining stability in the output electrical energy.

Figure 9:
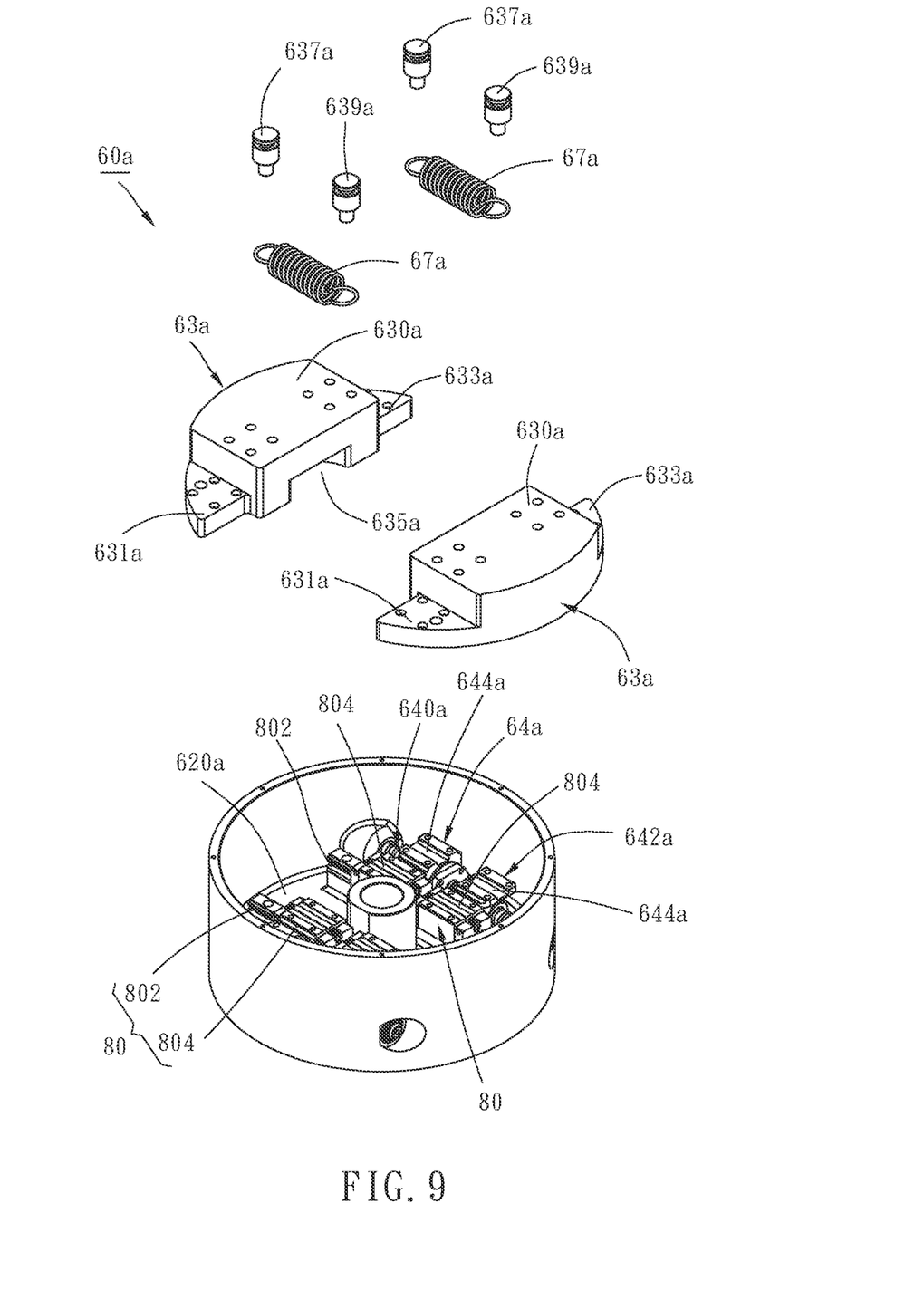
FIG. 9 is a partially exploded perspective view of a second embodiment of the invention.
Figure 10:
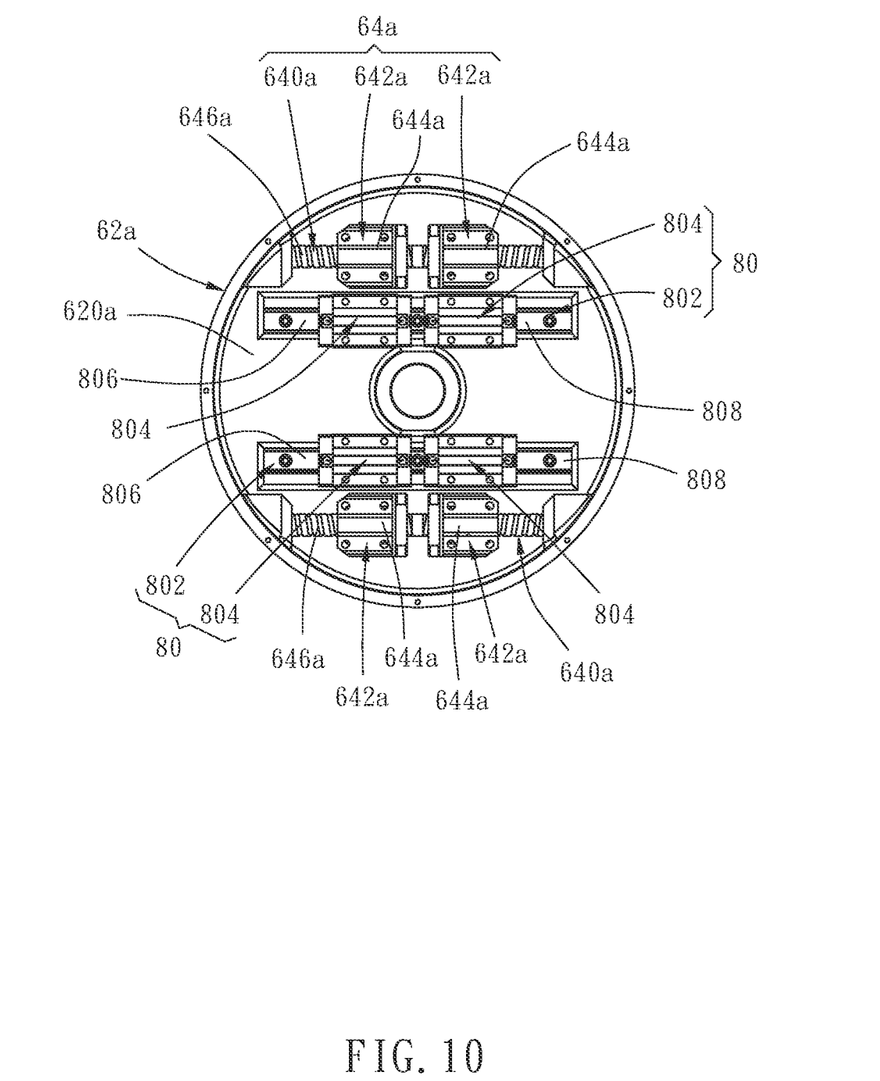
FIG. 10 is a top view of some parts assembled of the second embodiment of the invention shown in FIG. 9.
Figure 11:
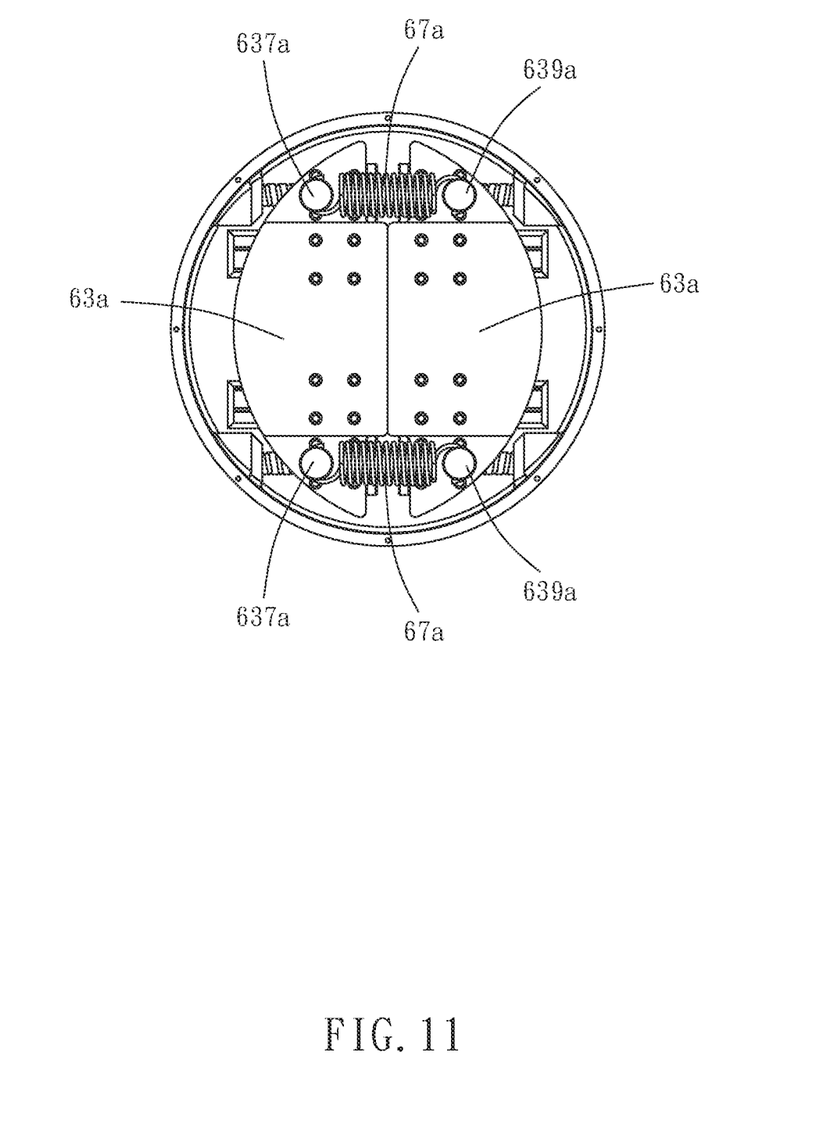
FIG. 11 is a top view of some parts assembled of the second embodiment of the invention shown in FIG. 9, with the two masses approaching to each other.

Referring to FIG. 9 to FIG. 11, a flywheel according to another embodiment of the invention is shown as 60a. The difference between the flywheel 60a and the flywheel 60 is the inclusion of a pair of linear guide devices 80. Each linear guide device 80 comprises a track member 802 with a first section 806 and a second section 808, and a pair of moving member 804 respectively coupled to the first section 806 and the second section 808. The track member 802 is fixed on the base plate 620a parallel to and adjacent to the screw shaft 640a of the ball screw device 64a. The moving member 804 is assembled to the track member 802 with a plurality of balls serving as rolling elements (not shown in the FIGS.).

Each mass 63a has a central portion 630a with an opening recess 635a, a left wing portion 631a, and a right wing portion 633a. The moving members 804 on one side of the track members 802 are received and fixed in the opening recess 635a of one mass 63a. The moving members 804 on the other side of the track members 802 are received and fixed in the opening recess 635a of the other mass 63a.

In this embodiment, each ball nut 642a has an upper portion 644a. When assembled, the ball nuts 642a screwed to the left sections 646a of the screw shafts 640a are fixed on the left wing portion 631a and the right wing portion 633a of one mass 63a by the upper portion 644a. The ball nuts 642a screwed to the right sections 647 of the screw shafts 640a are fixed on the left wing portion 631a and the right wing portion 633a of the other mass 63a by the upper portion 644a.

Additionally, the flywheel 60a includes a pair of springs 67a. One end of one of the springs 67a is fixed to the left wing portion 631a of one mass 63a with a first pin 637a, while the other end thereof is fixed to the left wing portion 631a of the other mass 63a with a second pin 639a. One end of the other spring 67a is fixed to the right wing portion 633a of one mass 63a with another pin 637a, while the other end thereof is fixed to the right wing portion 633a of the other mass 63a with another second pin 639a. Therefore, even when the weight of the mass 63a is greater than that of the mass 63, the mass 63a can move smoothly back and forth between the starting point and the end point with the assistance of the spring 67a.

What is claimed is:

1. A flywheel device, comprising:
    a disc-shaped body to be coupled to an external driving source;
    a pair of ball screw members;
    a pair of masses;
    each of the ball screw members including a screw shaft and a pair of ball nuts;
    the screw shaft radially pivoted within the disc-shaped body and having a middle section, a left section having forward threads, and a right section having reverse threads,
    one of the ball nuts screwed to the left section and the other ball nut screwed to the right section to allow each of the ball nuts moving back and forth between a starting position and an ending position; and
    one of the masses being coupled to the ball nuts screwed to the left sections of the screw shafts and the other mass being coupled to the ball nuts screwed to the right sections of the screw shafts to allow the masses approaching or moving away from the middle section synchronously, thereby enabling the moment of inertia of the flywheel to be variable.

2. The flywheel device of claim 1, further comprising a spring member arranged between the masses allowing it to stretch when the masses move apart and retract when they come closer.

3. The flywheel device of claim 1, wherein the body includes a base plate, an annular wall extending upward from the periphery of the base plate, and a receiving space defined by the base plate and the annular wall for receiving the ball screw members and the masses.

4. The flywheel device of claim 3, wherein each of the masses has a left wing portion with a left recess, and a right wing portion with a right recess, the ball nuts screwed to the left sections of the screw shafts are respectively received in the left recess and the right recess of one of the masses and the ball nuts screwed to the right sections of the screw shafts are respectively received in the left recess and the right recess of the other mass, thereby the masses can move synchronously with the ball nuts.

5. The flywheel device of claim 4, further comprising a first and second springs and each of the masses has a left groove and a right groove, one end of the first spring is fixed in the left groove of one of the masses using a first pin, and the other end of the first spring is fixed in the left groove of the other mass using a second pin, and one end of the second spring is fixed in the right groove of one of the masses using another first pin, and the other end of the second spring is fixed in the right groove of the other mass using another second pin.

6. The flywheel device of claim 1, further comprising a pair of linear guide devices, each linear guide device including a track member fixed within the disc-shaped body, parallel to and adjacent to the screw shaft of the ball screw device, and a moving member assembled to the track member via a plurality of balls serving as rolling elements, the moving members located on one side of the track members being fixed to one of the masses, and the moving members located on the other side of the track members being fixed to the other mass.

7. The flywheel device of claim 6, wherein each of the masses has a central portion with an opening recess, a left wing portion and a right wing portion; the moving members located on one side of the track members are received and fixed in the opening recess of one of the masses; and the moving members located on the other side of the track members are received and fixed in the opening recess of the other mass.

8. The flywheel device of claim 7, wherein each of ball nuts has an upper portion, the ball nuts screwed to the left sections of the screw shafts are respectively fixed on the left wing portion and the right wing portion of one of the masses by their the upper portions; and the ball nuts screwed to the right sections of the screw shafts are respectively fixed on the left wing portion and the right wing portion of the other mass by their upper portions.

9. The flywheel device of claim 8, further comprising a pair of springs, one end of one of the springs fixed to the left wing portion of one mass with a first pin, the other end thereof fixed to the left wing portion of the other mass with a second pin, and one end of the other spring fixed to the right wing portion of one mass with another first pin, the other end thereof fixed to the right wing portion of the other mass with another second pin.

* * * * *